United States Patent
Sawyer et al.

[11] Patent Number: 5,930,710
[45] Date of Patent: Jul. 27, 1999

[54] CONTROL/PILOT CHANNEL RESELECTION BETWEEN CELLS BELONGING TO DIFFERENT REGISTRATION AREAS

[75] Inventors: Francois Sawyer, St-Hubert; Francis Lupien, Montreal, both of Canada

[73] Assignee: Telefonaktiebolaget L M Ericsson, Stockholm, Sweden

[21] Appl. No.: 08/612,185

[22] Filed: Mar. 7, 1996

[51] Int. Cl.$^6$ ........................................... A40Q 7/36
[52] U.S. Cl. ........................... 455/436; 455/435; 455/437
[58] Field of Search .................... 455/421, 422, 455/435, 436, 450, 437, 438, 439, 434, 440, 446, 561; 45/442

[56] References Cited

U.S. PATENT DOCUMENTS

| | | |
|---|---|---|
| 4,608,711 | 8/1986 | Goldman . |
| 4,704,734 | 11/1987 | Menich et al. . |
| 4,737,978 | 4/1988 | Burke et al. . |
| 5,379,446 | 1/1995 | Murase . |
| 5,422,933 | 6/1995 | Barnett et al. . |
| 5,432,842 | 7/1995 | Kinoshita et al. . |
| 5,483,669 | 1/1996 | Barnett et al. . |
| 5,499,386 | 3/1996 | Karlsson . |
| 5,577,022 | 11/1996 | Padovani et al. . |
| 5,603,081 | 2/1997 | Raith et al. . |
| 5,640,414 | 6/1997 | Blakeney, II et al. . |
| 5,640,677 | 6/1997 | Karlsson . |
| 5,649,286 | 7/1997 | Frerking . |

OTHER PUBLICATIONS

International Switching Symposium, *Subscriber Tracking and Locating in Personal Communications Networks*, by G.Brody, J.Parker, and J.Wasserman, BNR, Richardson, TX; Oct. 1992, vol. 1; B3.2.

The GSM System for Mobile Communications; *Paging and Location Areas*; By Michel Mouly and Marie–Bernadette Pautet; Sep. 2, 1993; pp. 442–457.

*Location Registration and Paging in a Third Generation Mobile System*; by S.T.Chia; BT Technol J; vol. 9, No. 4; Oct. 1991; pp. 61–68.

*Primary Examiner*—William Cumming
*Assistant Examiner*—Linwood C. Scott, Jr.
*Attorney, Agent, or Firm*—Jenkens & Gilchrist

[57] ABSTRACT

In a TDMA or CDMA cellular telephone network including a plurality of registration areas, and in instances of mobile station cell re-selection between a cell located in a first registration area and a cell located in a second registration area, the mobile station processes control or pilot channel signal strength measurements in view of both a conventional reselection hysteresis and an additional registration hysteresis. Reselection is performed by the mobile station when the control or pilot channel signal strength measured with respect to the second registration area cell exceeds the control or pilot channel signal strength measured with respect to the first registration area cell by the sum total of both the reselection hysteresis and the registration hysteresis. This makes it more difficult to obtain an inter-registration area cell reselection to the benefit of minimizing the likelihood of incurring unnecessary consumption of valuable cellular air interface and system resources due to mobile station transit back and forth between the two registration areas.

15 Claims, 1 Drawing Sheet

CONTROL/PILOT CHANNEL RESELECTION BETWEEN CELLS BELONGING TO DIFFERENT REGISTRATION AREAS

BACKGROUND OF THE INVENTION

1. Technical Field of the Invention

The present invention relates to cellular telephone networks and, in particular, to the criteria for mobile station reselection of a control or pilot channel in a digital time division multiple access (TDMA) or code division multiple access (CDMA), respectively, cellular telephone system.

2. Description of Related Art

Cellular telephone systems include a plurality of base stations each serving a respective radio coverage area or cell. As a mobile station moves through the cellular service area in idle mode, it receives information identifying neighboring cells and continuously makes signal strength measurements on the control or pilot channels for each neighboring cell as well as the control or pilot channel for its current cell. From these signal strength measurements, and preferably by identifying the control or pilot channel having the strongest signal strength measurement, the mobile station selects a serving base station. This process is well known in the art with respect to a digital control channel and the TIA IS-136 Specification and with respect to the pilot channel in the TIA IS-95 Specification as mobile assisted cell reselection in idle mode.

When an idle mobile station is located on the border between two or more cells, the control or pilot channel signal strength measurements may be nearly the same. This could cause problems with the reselection of a control or pilot channel (and hence a cell) by that mobile station because variations in the measured momentary control or pilot channel signal strength levels when located on or near the border could trigger multiple reselections among and between the control or pilot channels of the two or more neighboring cells (commonly referred to as a "ping-pong" effect). The ping-pong effect is a significant concern because whenever the mobile station engages in a reselection at this location it unnecessarily expends a little more of its stored battery power, and perhaps may be temporarily unavailable for handling a communications task (such a receiving a page or making an access).

The TIA IS-136 Specification attempts to address the ping-pong effect problem by having the mobile station process the control channel signal strength measurements for purposes of control channel reselection in view of a reselection hysteresis. Reselection of a control channel by the idle mobile station occurs when the measured control channel signal strength for the destination cell exceeds that of the currently serving cell by at least the cell re-selection hysteresis. Reselection accordingly does not occur until the mobile station has moved away from the troublesome cell border area and well into the coverage area of the destination cell. A similar procedure is applied with respect to the pilot channel in accordance with the TIA IS-95 Specification.

The cells within a cellular telephone system may be conveniently grouped together for reference purposes by location area or system area (i.e., registration areas), with each such registration area including a plurality of similarly grouped cells. When a mobile station enters into a cell assigned to a different registration area, it must register with the cellular network at the time of control or pilot channel reselection. This registration process consumes a significant amount of both cellular air interface resources (in that a number of communications must occur to process the registration and recognize the mobile station) and cellular system resources (in registration processing and updating the home and visitor location registers). It would be preferred if such resources were not unnecessarily consumed with respect to a mobile station that is located near the boundary of, and perhaps is likely to move often back and forth between two different registration areas. Another problem exists with multiple registrations in that the system may become confused as to mobile station location. This is of primary concern when the cellular network is congested and registration messages are likely to be delayed. Accordingly, there is a need for a cellular control system and method that makes it more difficult for an idle mobile station to engage in control or pilot channel reselection with respect to a cell belonging to a different registration area.

SUMMARY OF THE INVENTION

For the cells in a cellular telephone network located adjacent to a boundary between two different registration areas, a registration hysteresis is specified in addition to the conventional cell reselection hysteresis for use by mobile stations in evaluating whether an inter-registration area control or pilot channel reselection is authorized. The inter-registration area control or pilot channel reselection is made by the mobile station when the signal strength measurement at the mobile station with respect to the control or pilot channel of the new cell in a different registration area exceeds the signal strength measurement at the mobile station with respect to the control channel or pilot channel of the old cell by the sum of both the specified reselection hysteresis and the specified registration hysteresis. This additional registration hysteresis accordingly makes it more difficult for a mobile station to reselect the control channel or pilot channel of the new cell, thus minimizing the likelihood of unnecessary reselections and the accompanying consumption of cellular air interface and system resources. The mobile station is informed of the requisite hysteresis values by means of a message transmission including a parameter for each of the reselection and registration hysteresis values, or including a single parameter reflecting the sum of the reselection and registration hysteresis values.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
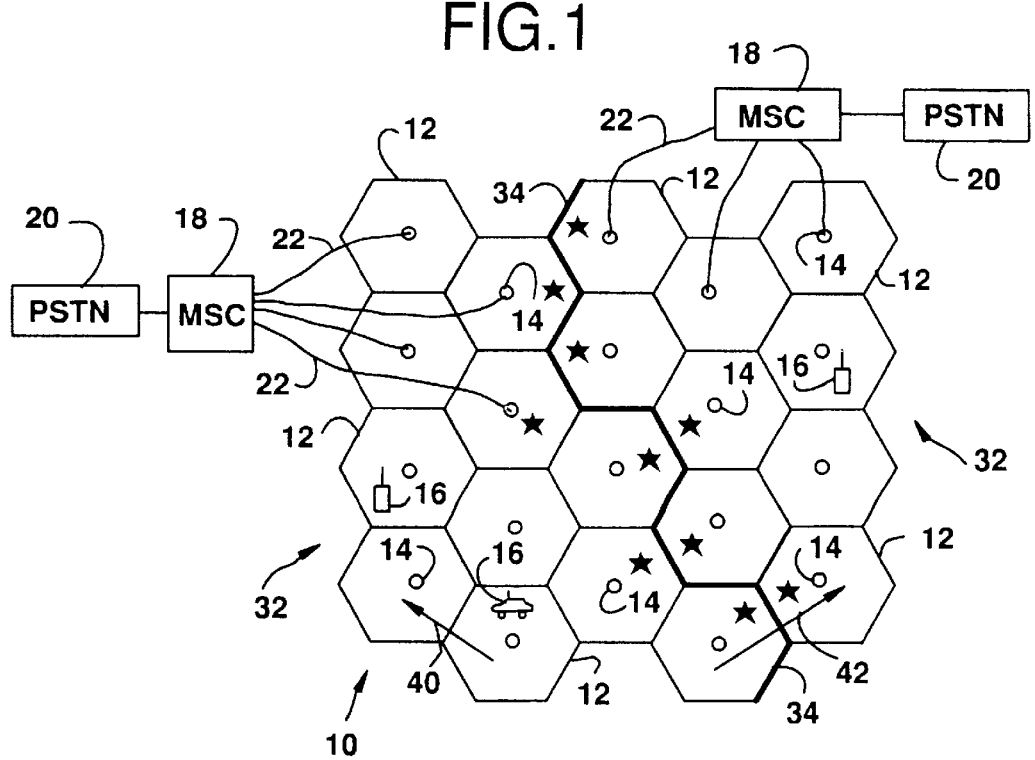
FIG. 1 is a schematic view of a cellular telephone system.

Reference is now made to FIG. 1 wherein there is shown a schematic view of a cellular telephone system 10 including a plurality of individual cells 12. The cellular telephone system 10 operates in accordance with one of a number of known air interface types including, for example, a digital time division multiple access (TDMA) protocol, or a digital code division multiple access (CDMA) protocol.

In a digital TDMA cellular telephone system, each cell 12 operates with an assigned set of transmission frequencies selected from the cellular frequency band. The set of frequencies assigned to each cell 12 includes frequencies supporting both at least one control channel and a plurality of voice channels, with the control and voice channels operable in either or both an analog and/or a digital mode. Sets of assigned frequencies are different for adjacent cells 12, and such sets are not repeated for use by other cells except for those cells that are far enough away from each other to minimize the likelihood of adjacent or co-channel interference.

In a digital CDMA cellular telephone system, plural cells 12 operate over the same frequency in a spread spectrum fashion. Digitized speech is multiplied by a pseudo-random code to "spread" the spectrum and provide the voice channels for subscriber communications. By pseudo-random it is meant that the multiplying data appears to be random but is in fact following a known direct sequence. The output signal is then mixed with the carrier frequency assigned to the cell and broadcast. To effectuate control over system operation, a control channel is also spread spectrum broadcast in each cell. For effectuating cell selection by the mobile stations, a pilot channel is also spread spectrum broadcast, with the cells distinguished from each other by the use of differing code phases for the pilot channel broadcasts.

In either a TDMA or CDMA system, a base station 14 including one or more transceivers (not shown) is provided for each of the cells 12. Via the transceivers, the base stations 14 engage in simultaneous communications with plural mobile stations 16 operating within the area of the associated cell 12. The control channel assigned to each cell 12 is used to carry system control signals between the base station 14 and proximately located mobile stations 16, and also to assist in TDMA systems with mobile station cell reselection. Such control signals include call originations, page signals, page response signals, location registration signals, voice channel assignments, maintenance instructions, and cell selection or reselection instructions. The voice channels provided in each cell 12 are used to carry subscriber voice or data communications between the base station 14 and proximately located mobile stations 16. The pilot channel assigned to each CDMA cell 12 is used to assist in cell reselection by the mobile stations 16.

The base stations 14 further communicate via data links (and voice trunks) 22 (only some shown) with a central control station, commonly referred to as a mobile switching center 18, which functions to control operation of the network 10. The mobile switching center 18 is connected to other mobile switching centers (not shown) and/or to the public switched telephone network (PSTN) 20. In particular, the mobile switching center 18 operates to selectively connect subscriber voice and data communications to the mobile stations 16 through the base stations 14. Thus, the mobile switching center 18 controls system operation through and in response to the transmission of control signals over the control channels to set-up on the voice channels calls that are either originated by or terminated at the mobile stations 16. The mobile switching center 18 further controls, through and in response to control channel transmissions, the handoff of a subscriber communication from a voice channel of one cell 12 to a voice channel of another cell as the subscriber mobile station 16 roams throughout the cellular service area during an ongoing communication. Server selection by mobile stations in TDMA system is generally made responsive to control channel signal strength measurements, while in CDMA systems the pilot channel in each cell is monitored by the mobile stations for use in making a server selection.

It is common within one overall cellular service area to have a plurality of registration areas 32, with each registration area including a plurality of cells 12. The registration areas 32 may comprise, for example, location areas (differentiated from each other by the fact that they have different location identifications (LOCAIDs)) or system areas (differentiated from each other by the fact that they have different system identifications (SIDs) and perhaps have different service providers). A boundary 34, passing between cells 12 along the border between two registration areas 32, is shown in bold in FIG. 1 to delimit the physical extent of each of the illustrated registration areas. Whenever a mobile station moves from one registration area 32 to another registration area, it sends a registration message to the mobile switching center.

As a mobile station moves through the cellular service area in idle mode, it continuously monitors the control or pilot channel of the currently serving cell, and further makes signal strength measurements on the control or pilot channels of neighboring cells. From these signal strength measurements, and preferably by identifying the control or pilot channel having the strongest signal strength measurement, the mobile station selects a serving base station. This process is well known in the art, for example with respect to a digital control channel in the TIA IS-136 Specification and a pilot channel in the TIA IS-95 Specification, as mobile assisted cell reselection in idle mode.

Figure 2:
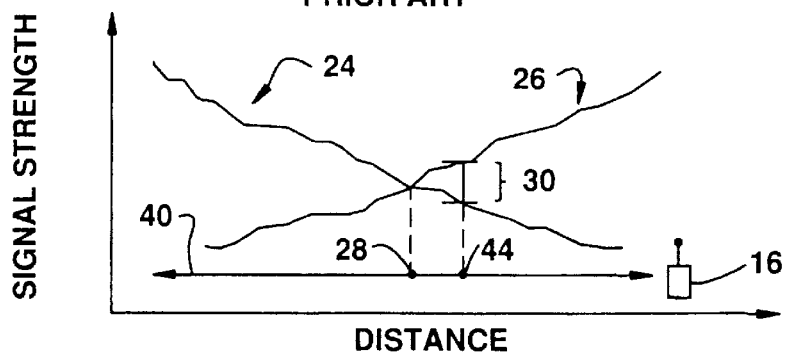
FIG. 2 is a graph illustrating variations in measured signal strength at a mobile station, and the use of a reselection hysteresis during intra-registration area control or pilot channel reselection.

Reference is now additionally made to prior art FIG. 2 wherein there is shown a graph illustrating variations in measured signal strength at a mobile station, and the use of a reselection hysteresis during conventional intra-registration area control or pilot channel reselection by the mobile station. Measured control or pilot channel (or other reference channel) signal strength at the mobile station is plotted against the vertical axis, while distance from the base station in a first (currently serving) cell to the base station in a second (destination) cell in the same registration area 32 is plotted against the horizontal axis. As the mobile station 16 moves from the broadcast coverage area of the first cell 12 towards the second cell, for example, in the direction of arrow 40 also shown in FIG. 1, first cell control or pilot channel measured signal strength decreases (as generally indicated at 24). At the same time, as the mobile station moves towards the base station in the second cell, second cell control or pilot channel measured signal strength increases (as generally indicated at 26).

Intuitively, it would appear that the best point for mobile station reselection of the second cell control or pilot channel would be at approximately half way between the two base stations where the measured signal strengths are substantially the same (i.e., intersection point 28). In practice, however, this point 28 is not the best reselection point because subsequent variations in the momentary measured signal strength levels at this point could trigger an unnecessary reselection back to the control or pilot channel of the first cell (commonly referred to as a "ping-pong" effect). To counteract this effect, for example in accordance with a digital control channel in the TIA IS-136 Specification and a pilot channel in the TIA IS-95 Specification, a reselection hysteresis quantity 30 is introduced to, in effect, offset the measured signal strengths and delay mobile station reselection of the control channel for the second cell. Reselection of the second cell control channel does not then occur until the point 44 where the measured control channel signal strength with respect to the second cell exceeds the measured control channel signal strength with respect to the first cell by the reselection hysteresis quantity 30 assigned to the second cell. At that point, the mobile station has moved well within the coverage area of the second cell, and the likelihood that the mobile station will re-enter the first cell is reduced.

Figure 3:
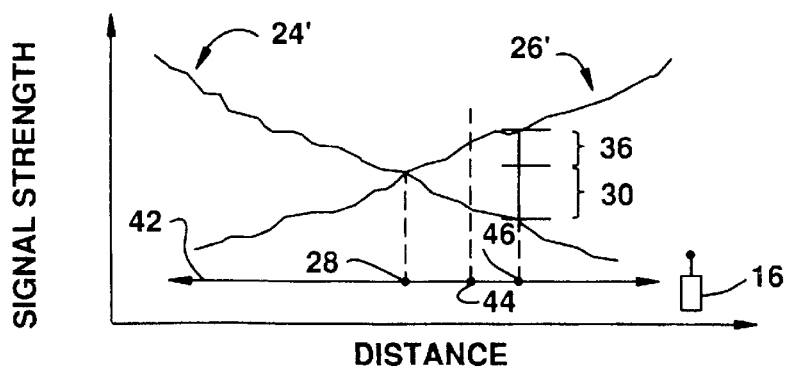
FIG. 3 is a graph illustrating variations in measured signal strength at a mobile station, and the use of a registration hysteresis in addition to the reselection hysteresis during inter-registration area control or pilot channel re-selection.

Reference is now additionally made to FIG. 3 wherein there is shown a graph illustrating variations in measured signal strength, and the use of a registration hysteresis in addition to the reselection hysteresis during inter-registration area control or pilot channel reselection by the mobile station. Again, measured control or pilot channel signal strength at the mobile station is plotted against the vertical axis, while distance from the base station in a first (currently serving) cell in a first registration area 32 to the base station in a second (destination) cell in a second registration area is plotted against the horizontal axis. As the mobile station 16 moves from the broadcast coverage area of the first cell 12 (and the first registration area 32) towards the second cell (and the second registration area), for example, in the direction of arrow 42 also shown in FIG. 1, first cell measured signal strength decreases (as generally indicated at 24'). At the same time, as the mobile station moves towards the base station in the second cell, second cell measured signal strength increases (as generally indicated at 26').

In accordance with the control channel reselection scenario illustrated in FIG. 2 between two cells located within the same registration area 32, second cell control or pilot channel reselection is typically made by the mobile station at the point 44 where the measured signal strength with respect to the second cell exceeds the measured signal strength with respect to the first cell by the reselection hysteresis quantity 30. In this instance of FIG. 3 wherein inter-registration area control or pilot channel re-selection is contemplated, however, this point 44 is not the best reselection point if a likelihood exists that the mobile station may remain along the boundary 34, and perhaps move back into the previous registration area 32. Extraneous registration through control or pilot channel reselection unnecessarily consumes valuable cellular air interface and system resources (for example, signaling resources used in updating the home location register) as the mobile station moves back and forth across or near the boundary 34.

To counteract this concern, a registration hysteresis quantity 36 is introduced, to be used in addition to the reselection hysteresis quantity 30, with respect to each cell 12 of the system (indicated with a star in FIG. 1) located along the boundary 34 between registration areas 32. This additional registration hysteresis quantity 36, in effect, further offsets the measured signal strengths and further delays inter-registration area control or pilot channel reselection by the mobile station from the point 44 of intra-registration area reselection illustrated in FIG. 2. Reselection of the control or pilot channel of the second cell (in the second registration area) accordingly is not made by the mobile station until that point 46 where the measured signal strength with respect to the second cell control or pilot channel exceeds the measured signal strength with respect to the first cell control or pilot channel by the sum total of both the reselection hysteresis quantity 30 and the registration hysteresis quantity 36 assigned to the second cell. At that point, the mobile station has moved yet further well within the coverage area of the second cell (in comparison to that experienced with the intra-registration area reselection of FIG. 2), and the likelihood of mobile station re-entry into the previous registration area 32 is further reduced.

The additional registration hysteresis quantity 36 is not considered during intra-registration area reselection (FIG. 2), even if the destination (second) cell 12 is located along the boundary 34. It is only used when addressing instances of inter-registration area reselections.

The hysteresis value or values applicable to a given mobile station are broadcast from the base stations in each cell. In one embodiment, the message broadcast from a base station includes a single hysteresis parameter reflecting the sum of the reselection hysteresis value and the registration hysteresis value. In another embodiment, the message broadcast from a base station includes a parameter for each of the reselection hysteresis and the registration hysteresis values.

It is recognized that there may occur instances where the location of the border 34 between registration areas 32 may change. It is important, then, to account for this contingency in assigning registration hysteresis values to the cells 12. One way of accounting for border 34 movement is to assign a registration hysteresis to each cell 12 regardless of location. Thus, both cells located along the border 34 as well as those cells located away from the border will have a registration hysteresis value. To properly manage cell reselection operation by the mobile stations 16 in accordance with FIG. 3, however, the registration hysteresis is set to zero for all non-border cells. Thus, when making an inter-registration area reselection, both the specified reselection hysteresis in addition to the non-zero registration hysteresis are considered. In the event the border 34 should subsequently shift, the registration hysteresis for new border cells is set to an appropriate non-zero value, and those cells which are no longer located along the border have their registration hysteresis values reset to zero.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A cellular telephone system including multiple registration areas, wherein each registration area comprises a plurality of cells, and each cell is assigned at least one reselection hysteresis value to be accounted for during intra-registration area mobile station server selection, and wherein cells located along a border of the registration area are assigned at least one registration hysteresis value in addition to any assigned reselection hysteresis values to be accounted for during inter-registration area mobile station server selection.

2. The system of claim 1 further including a plurality of mobile stations wherein each mobile station is operable to select a target one of the cells from a current one of the cells during intra-registration area cell selection when measured signal strength with respect to the target cell exceeds measured signal strength with respect to the current cell by at least the assigned reselection hysteresis value for the target cell.

3. The system of claim 1 further including a plurality of mobile stations wherein each mobile station is operable to select a target one of the cells in one registration area from a current one of the cells in another registration area during inter-registration area cell selection when measured signal strength with respect to the target cell exceeds measured signal strength with respect to the current cell by at least the sum of the assigned reselection and registration hysteresis values for the target cell.

4. The system of claim 3 wherein the signal strength measurements are made on a time division multiple access (TDMA) control channel of the system in both the current cell and the target cell.

5. The system of claim 3 wherein the signal strength measurements are made on a code division multiple access (CDMA) pilot channel of the system in both the current cell and the target cell.

6. The system of claim 1 wherein each of the cells is assigned the registration hysteresis value, and wherein the cells located along the border of the registration area have non-zero values and the cells located away from the border of the registration area have zero values.

7. In a cellular telephone system including a plurality of registration areas each including a plurality of cells, wherein each cell has an assigned reselection hysteresis value, and certain cells have an additional assigned registration hysteresis value to be accounted for during inter-registration area cell selection, a method for cell reselection between cells located in different registration areas comprising the steps of:

making signal strength measurements on both a currently serving cell in one registration area and a target certain cell in another registration area;

comparing the measured signal strengths with respect to the currently serving cell and target certain cell; and reselecting the target certain cell over the currently serving cell if the measured signal strength for the target certain cell exceeds the measured signal strength for the currently serving cell by at least the sum of the reselection and registration hysteresis values of the target certain cell.

8. The method as in claim 7 wherein the step of making signal strength measurements comprises the step of measuring on a control channel allocated to the currently serving cell and a control channel allocated to the target certain cell.

9. The method as in claim 7 wherein the step of making signal strength measurements comprises the step of measuring on a pilot channel allocated to the currently serving cell and a pilot channel allocated to the target border cell.

10. The method as in claim 7 wherein the certain cells comprise cells located along a border between registration areas.

11. A cellular telephone system including multiple registration areas, comprising:

a plurality of cells each having an assigned reselection hysteresis value, the cells including certain cells having an additional assigned registration hysteresis value; and a mobile station moving through the cells and engaging in server selections thereof by making signal strength measurements with respect to both a currently serving cell in one registration area and a target certain cell in another registration area, the mobile station reselecting the target certain cell over the currently serving cell if the measured signal strength for the target certain cell exceeds the measured signal strength for the currently serving cell by at least the sum of the reselection and registration hysteresis values of the target certain cell.

12. The system of claim 11, with the mobile station further making signal strength measurements with respect to both a currently serving cell and a target certain cell in the same registration area, the mobile station reselecting the target certain cell over the currently serving cell if the measured signal strength for the target certain cell exceeds the measured signal strength for the currently serving cell by the reselection hysteresis value of the target certain cell.

13. The system of claim 11 wherein the mobile station makes signal strength measurements on a time division multiple access (TDMA) control channel of the system in both the currently serving cell and the target cell.

14. The system of claim 11 wherein the mobile station makes signal strength measurements on a code division multiple access (CDMA) pilot channel of the system in both the currently serving cell and the target cell.

15. The system as in claim 11 wherein the certain cells comprise cells located along a border between adjacent registration areas.

* * * * *